Feb. 28, 1928.
D. H. SWEET
SHOCK ABSORBER
Filed Sept. 26, 1921
1,660,457
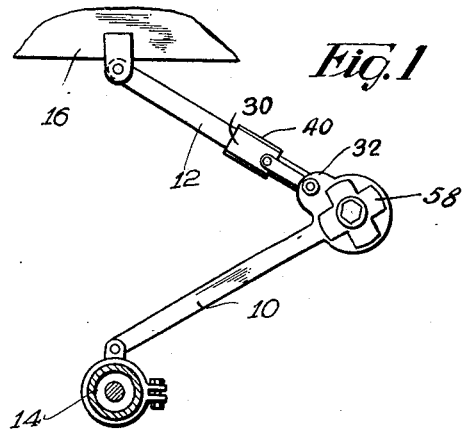
*Fig. 1*
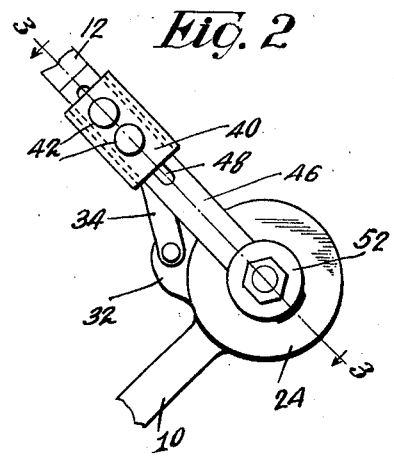
*Fig. 2*
*Fig. 3*
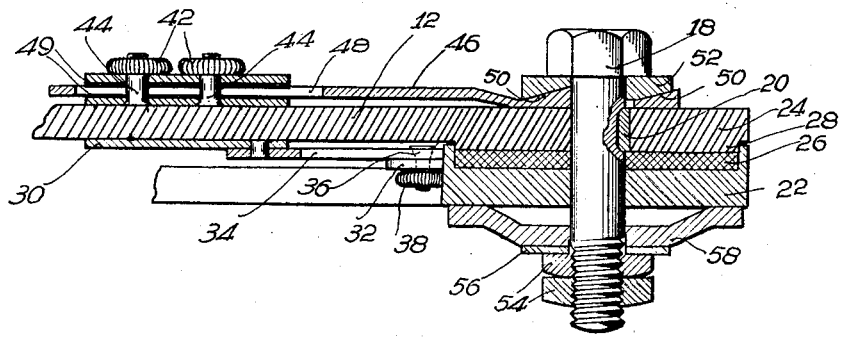
Inventor
Donald H. Sweet Patented Feb. 28, 1928.

1,660,457

UNITED STATES PATENT OFFICE.

DONALD H. SWEET, OF CHICAGO, ILLINOIS.

SHOCK ABSORBER.

Application filed September 26, 1921. Serial No. 503,176.

The object of my invention is to improve means for decreasing the jars and movements to which the body of a vehicle is subjected in traveling over an uneven surface.

In the accompanying drawings:

Fig. 1 is a side view of apparatus according to my invention;

Fig. 2 is a view of the other side on a larger scale; and

Fig. 3 is a section on line 3—3 of Fig. 2 on a still larger scale.

In the embodiment of my invention selected for illustration, pivoted arms 10 and 12 are connected at their ends to the axle 14 of the vehicle, and to the chassis 16 supported above the axle by springs (not shown) respectively.

The joint between the parts comprises a pintle 18, keyed at 20 to arm 12. The arms are enlarged to form heads 22 and 24 centered about pintle 18. One head has a cup-shaped depression facing toward the other and containing a filling of friction material 26. A boss 28 projects from head 24 into the depression to keep the parts centered and seal the depression.

A sleeve 30 slides loosely on arm 12 and is connected to a lug 32 on head 22 by a link 34. The pintle 36 connecting lug 32 and link 34 may be tapered if desired and provided with an adjusting nut 38. A U-shaped clip 40 overlies sleeve 30 and may be pressed against the same by means of nuts 42 on studs 44. Between the clip and the sleeve lies a slide 46 in frictional engagement with both sleeve and clip, being slotted at 48 to accommodate studs 44. Friction linings 49 may be provided at this point. Slide 46 terminates in a perforate head encircling pintle 18, the perforation being enlarged to permit limited movement of the slide. Wedge surfaces 50 cooperate with similar faces in a slotted cap 52 interposed between them and the head of pintle 18. The other end of the pintle carries ordinary lock nuts 54, preferably bearing on a washer 56 of brass or antifriction metal. A flat stiff leaf spring 58 with four arms may be interposed between washers 56 and the adjacent head.

Any displacement of the parts from the position shown in Fig. 1 will move the sleeve toward the pintle 18 and the parts are preferably so adjusted that during this movement the resistance of the device is relatively small or practically negligible. The beginning of the return movement, however, will draw slide 46 with sleeve 30 and cap 52 will be forced away from the head 24, drawing the heads forcibly together and occasioning relatively great frictional resistance to the return movement.

Without further elaboration the foregoing will so fully explain the gist of my invention that others may, by applying current knowledge, readily adapt the same for use under various conditions of service, without eliminating certain features which may properly be said to constitute the essential items of novelty involved, which items are intended to be defined and secured to me by the following claims.

I claim:—

1. In combination, two pivoted elements, a member slidable on one element and linked to the other for movement toward the pivotal connection upon relative displacement of said elements in either direction from a predetermined position, means adjacent the pivotal connection for varying the frictional resistance to movement between said elements, and an operative connection between said member and said friction varying means.

2. In combination, pivoted elements having a friction connection, control means slidable on one element and link connected to the other for varying the frictional resistance of said connection, said link connection having lost motion, and means for varying the lost motion of said link connection.

3. In combination, pivoted elements having a friction connection, and control means slidable on one element and link connected to the other for varying the frictional resistance of said connection, said link going past dead center at substantially the mid point of the range of movement of the said elements.

4. In combination, an axle, a chassis normally spaced from said axle for relative movement with respect thereto within a limited range, a first and a second friction element, connections between the first element and the chassis, and between said second element and the axle for causing relative movement of said friction elements, and automatic means for varying the friction to make it relatively weak during movement in either direction away from a predetermined intermediate position and a material initial portion of the return movement and thereafter applying a maximum friction.

5. In combination, an axle; a chassis normally spaced from said axle for relative movement with respect thereto within a limited range, a first and a second friction element, connections between the first element and the chassis, and between the second element and the axle for causing relative movement of said friction elements, and automatic means for varying the friction to make it substantially negligible during movement in either direction away from a predetermined intermediate position and during a material portion of the return movement after each excursion, and thereafter developing substantial friction to retard the return movement.

6. In combination, an axle; a chassis normally spaced from said axle for relative movement with respect thereto within a limited range; a first and a second friction element; connections between the first element and the chassis, and between the second element and the axle, for causing relative movement of said friction elements; automatic control means for varying the friction to reduce it to a substantially negligible amount upon passing through a predetermined intermediate normal position in either direction and thereafter during all movement away from normal regardless of the extent of the excursion, and for the initial portion of the return movement regardless of the extent of the preceding excursion, and thereafter applying a maximum friction, the undamped portion of the return movement being slightly greater in case of a short excursion than in case of a long one; said automatic control means permitting said initial undamped return movement by reason of back lash between its parts, and adjustment means for varying the amount of undamped return movement by varying the back lash.

7. In combination, an axle; a chassis normally spaced from said axle for relative movement with respect thereto within a limited range; a first and a second friction element; connections between the first element and the chassis, and between the second element and the axle, for causing relative movement of said friction elements; and automatic control means for varying the friction to reduce it to a substantially negligible amount upon passing through a predetermined intermediate normal position in either direction and thereafter during all movement away from normal regardless of the extent of the excursion, and for the initial portion of the return movement regardless of the extent of the preceding excursion, and thereafter applying a maximum friction, the undamped portion of the return movement being not less, in case of a short excursion than in case of a long one.

8. In combination, an axle; a chassis normally spaced from said axle for relative movement with respect thereto within a limited range; a first and a second friction element; connections between the first element and the chassis, and between the second element and the axle, for causing relative movement of said friction elements; and automatic control means for varying the friction to reduce it to a substantially negligible amount upon passing through a predetermined intermediate normal position in either direction and thereafter during all movement away from normal regardless of the extent of the excursion, and for the initial portion of the return movement regardless of the extent of the preceding excursion, and thereafter applying a maximum friction, the undamped portion of the return movement being slightly greater in case of a short excursion than in case of a long one; said automatic control means permitting said initial undamped return movement by reason of back lash between its parts.

In witness whereof, I hereunto subscribe my name this 24 day of September, 1921.

DONALD H. SWEET.